W. G. BURNS.
APPARATUS FOR COOLING COFFEE, &c.
APPLICATION FILED DEC. 6, 1915.
1,218,978.
Patented Mar. 13, 1917.
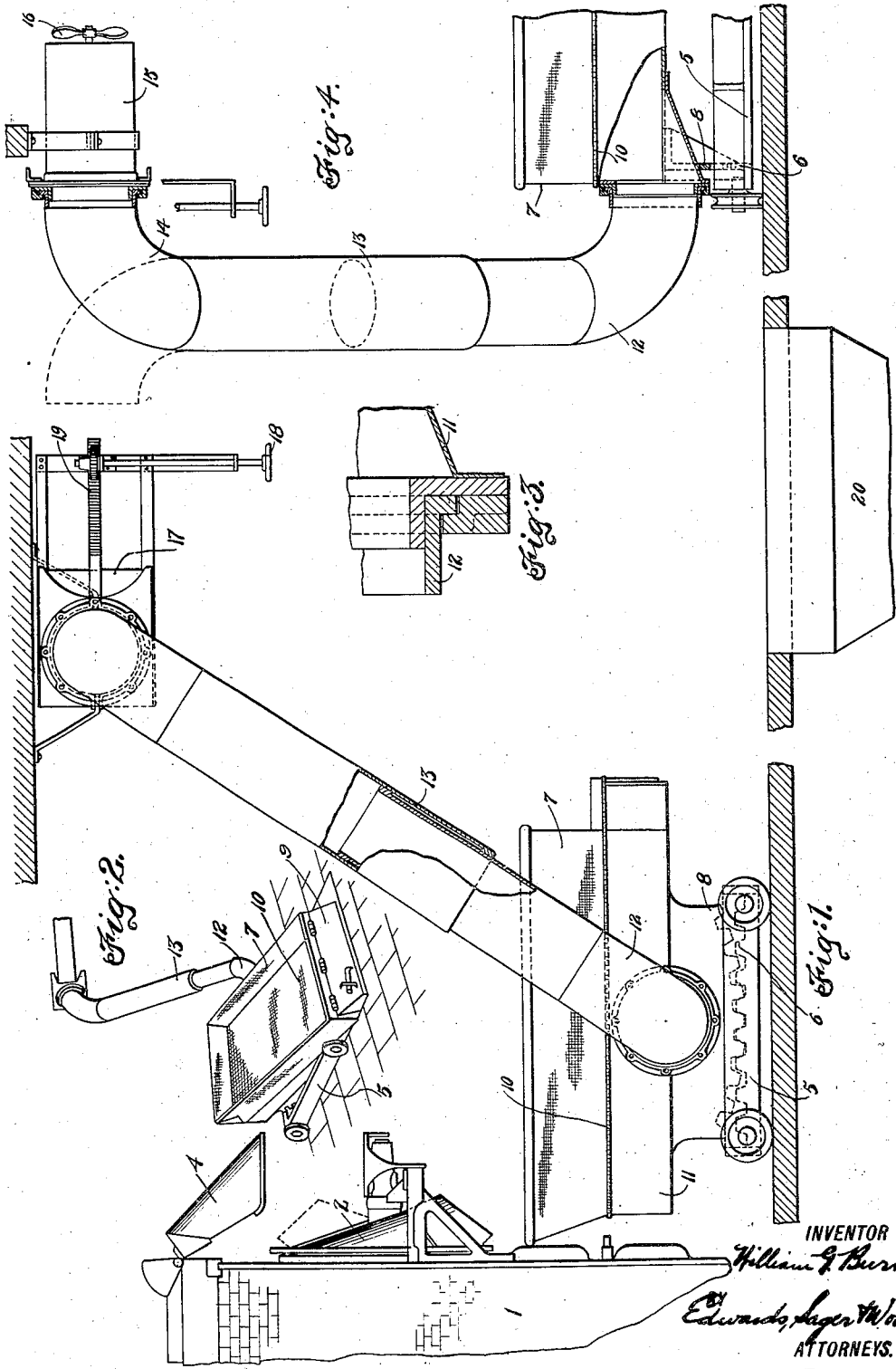
INVENTOR
William G. Burns,
By Edwards, Sager & Wooster
ATTORNEYS.

UNITED STATES PATENT OFFICE.

WILLIAM G. BURNS, OF NEW YORK, N. Y., ASSIGNOR TO JABEZ BURNS & SONS, A CORPORATION OF NEW YORK.

APPARATUS FOR COOLING COFFEE, &c.

1,218,978.　　　　Specification of Letters Patent.　　Patented Mar. 13, 1917.

Application filed December 6, 1915. Serial No. 65,222.

*To all whom it may concern:*

Be it known that I, WILLIAM G. BURNS, a citizen of the United States, residing at New York, in the county of New York and State of New York, have invented certain new and useful Improvements in Apparatus for Cooling Coffee, &c., of which the following is a full, clear, and exact specification.

This invention relates to an apparatus for cooling coffee or other materials, which are first heated or roasted to a certain degree, and then require rapid cooling to prevent further chemical change.

The invention is not only applicable to the roasting of coffee, but also to the treatment of various other materials, such as cereals, and even products not intended for foods, wherever rapid cooling is desired to stop or control the action of heat on the material.

For example, when coffee is completely roasted, it is at a relatively high temperature in the neighborhood of 400° F., and when discharged in mass from the roaster must be quickly cooled to atmospheric temperature, or it will continue to roast, becoming darker in color, uneven in quality, etc. It is therefore the practice to place the roasted coffee in a cooler car, consisting of sides, a perforated bottom, and a suction box below the bottom to be connected to an exhauster main at a point distant from the roaster.

The object of this invention is to provide flexible connections between the exhaust main and the cooler car, so that the cooler car can remain connected with the exhauster, whether in position at the roaster or when moved away from the roaster and at the discharge point.

This invention provides a permanent and flexible connection between the cooler car and the exhaust fan, or trunk exhaust main, where several cooler cars are used. The operator can thus move the cooler car up to the roaster, open the gate to the exhaust main, and then immediately open the roaster and discharge the hot coffee into the car, and this same exhaust pressure remains effective while the car is moved away from the roaster. Thus, the cooling of a large body of coffee is facilitated, and steam, smoke, fumes, etc., do not escape into the room. When the coffee is sufficiently cooled, the air gate can be closed to cut off the suction. A particular feature of this invention resides in the maintaining of the continuous suction with a movable tipping car, that is one in which the receptacle or box can be tipped to discharge the contents through a chute into a bin, or to the floor below, without any interference with the air connections.

The form specifically shown herein comprises an overhead air main, a depending and telescopic suction pipe attached thereto by a joint, and a joint between the lower end of the telescopic pipe and the suction box of the tipping car, this second joint permitting the car to be tipped in dumping.

In the accompanying drawings,

Figure 1 is an elevation of a portion of a plant embodying the invention;

Fig. 2 is a perspective view showing the cooler car in tipped position;

Fig. 3 is a detail view of one of the flexible joints, and

Fig. 4 is an end elevation.

1 represents a roaster of any desired form, herein shown as having a rotatable discharge door 2, which in the position shown discharges coffee into the cooler car, but which can be rotated through 180° to the position shown in dotted lines behind hood 4, while the coffee is being roasted. The cooler car comprises a truck 5 carrying racks 6, upon which the body 7 is supported by rocking gears 8 to permit the coffee to be discharged through hinged end 9 when the car is tipped. The bottom 10 is perforated, the perforations being of such size as to allow passage of air without passage of the particular material being cooled. Consequently, for coffee, the perforations would be smaller than the coffee bean, and for other materials the perforations would be correspondingly varied. Below the bottom 10 is a suction box 11.

The suction box 11 extends through the side of the car, and flexibly connects with an upwardly turned and swiveled elbow 12. The elbow 12 is telescopically connected to an upwardly extending tube 13, which in turn is connected to a second elbow 14 swiveled to the overhead air main 15. The two flexibly and telescopically connected elbows thus enable a continuous connection to be maintained between the exhaust main and the movable tipping car. 16 is an exhaust fan if the material is to be cooled by suction, or a blower if a blast of air is to be blown through the material. 17 is a gate which can be operated by hand wheel 18 and rack 19. 20 is a chute through which the material in the car may be discharged to the floor below. The dotted lines in Fig. 4, show how the upper elbow can be turned to accommodate a differently located main.

In operation, the car will be moved up to the roaster to receive a load and the suction turned on, so that the fumes from the hot material will be immediately drawn down through the perforated bottom and the exhaust main. By this invention the car can be moved and dumped without at any time interrupting the blast. So far as I am aware, this result has not heretofore been accomplished, as in all the devices with which I am familiar, it has been necessary to disconnect the car from the main when it is to be charged.

From the foregoing description the nature and advantages of the invention will be fully understood, and it will be seen that a uniform blast will be applied to the coffee at any position of the car and that the quality of the roasted coffee will be more uniform without depending upon the manual labor of stirring and shoveling the coffee as it comes from the roaster before the suction is applied. The broad features of the invention herein disclosed are disclaimed, as the same are the prior invention of Richard A. Greene as set forth and claimed in application Serial No. 75,472, filed January 31, 1916.

It will be understood that the invention is not limited to an exhaust apparatus, as in some instances, this invention will be useful where air is to be blown to a movable car.

Various modifications and changes in the specific details and arrangements herein shown may be made without departing from the scope of the appended claims.

Having thus described my invention, I declare that what I claim as new and desire to secure by Letters Patent, is:—

1. The combination with a reciprocating cooling car, an elbow horizontally pivoted at one end to said car, an air main, a second elbow parallel to said first elbow and horizontally pivoted to said main, and a telescopic pipe connection between said elbows.

2. The combination with a reciprocatory tipping cooling car, of an elbow pivoted to said car in the tipping axis, a stationary air main, an elbow pivoted thereto parallel to said first elbow, and a telescopic connection between said elbows.

3. The combination with a tipping car, of an elbow swiveled thereto, a stationary main, and a second elbow swiveled thereto and telescopically connected with said first elbow.

4. The combination with a truck, of a cooling car mounted to rock thereon, an elbow swiveled to said car, a stationary main, a second elbow swiveled thereto, and a continuous extensible connection between said elbows.

5. The combination with a traveling tipping car, an elbow horizontally swiveled thereto, a stationary overhead main having a depending horizontally pivoted elbow, and means telescopically connecting said elbows to form a continuous passage between the car and the stationary main.

In testimony whereof I affix my signature, in presence of two witnesses.

WILLIAM G. BURNS.

Witnesses:
CHARLES H. MACLACHLAN,
THOMAS A. O'BRIEN.